United States Patent [19]
Sasaki et al.

[11] Patent Number: 6,125,316
[45] Date of Patent: *Sep. 26, 2000

[54] METHOD OF AND SYSTEM FOR DECIDING FAILURES OF AUTOMATIC TRANSMISSION

[75] Inventors: Kazuo Sasaki; Kenji Sawa, both of Hiroshima, Japan

[73] Assignee: Mazda Motor Corporation, Hiroshima, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/645,333

[22] Filed: May 13, 1996

[30] Foreign Application Priority Data

May 12, 1995 [JP] Japan ..................... 7-114776

[51] Int. Cl.$^7$ ..................................................... G06F 17/00
[52] U.S. Cl. ................................. 701/62; 701/51; 701/67; 192/3.3; 192/3.58; 477/169
[58] Field of Search ....................... 364/424.08, 424.096, 364/424.097, 424.088; 477/121, 169, 152, 176, 143, 155, 62, 65, 907, 180, 107, 120, 125, 126, 131, 904, 906; 192/3.3, 3.58, 3.31, 103 F, 73, 92; 701/66, 67, 29, 62, 51, 63, 64; 74/335, 336 R; 475/128, 129

[56] References Cited

U.S. PATENT DOCUMENTS

| | | |
|---|---|---|
| 4,757,886 | 7/1988 | Brown et al. .......................... 192/3.3 |
| 4,843,551 | 6/1989 | Milunas .................................. 701/55 |
| 4,940,122 | 7/1990 | Fujieda .................................. 192/3.31 |
| 4,957,194 | 9/1990 | Sawa et al. ............................ 477/169 |
| 5,029,087 | 7/1991 | Cowan et al. .................... 364/424.097 |
| 5,035,308 | 7/1991 | Baba et al. .............................. 477/62 |
| 5,086,889 | 2/1992 | Nobumoto et al. ....................... 477/62 |
| 5,167,311 | 12/1992 | Satoh et al. ...................... 364/424.096 |
| 5,226,513 | 7/1993 | Shibayama .......................... 192/0.032 |
| 5,305,663 | 4/1994 | Leonard et al. ........................ 475/123 |
| 5,323,320 | 6/1994 | Hathaway et al. ............... 364/424.096 |
| 5,413,539 | 5/1995 | Leonard et al. ......................... 475/63 |
| 5,515,272 | 5/1996 | Sakai et al. ............................. 701/29 |
| 5,609,067 | 3/1997 | Mitchell et al. ..................... 74/336 R |
| 5,611,750 | 3/1997 | Kono et al. ............................. 477/65 |
| 5,643,137 | 7/1997 | Suzuki .................................. 477/169 |
| 5,721,682 | 2/1998 | Arai et al. ............................... 701/67 |

Primary Examiner—Jacques H. Louis-Jacques
Attorney, Agent, or Firm—Nixon Peabody LLP; Donald R. Studebaker

[57] ABSTRACT

A gear shift failure of an automatic transmission to a wrong gear other than an indented gear is made by estimating slippage theoretically caused in a torque converter on the basis of an engine speed and a turbine speed theoretically determined for an intended gear according to the vehicle speed and comparing the estimating slippage with predetermined reference slippage. When the estimated slippage exceeds the predetermined threshold slippage, it is decided that there has occurred a wrong shift to a gear other than the intended gear.

21 Claims, 11 Drawing Sheets

METHOD OF AND SYSTEM FOR DECIDING FAILURES OF AUTOMATIC TRANSMISSION

BACKGROUND OF THE INVENTION

1. Field of the Invention

This invention relates to a method of and a system for detecting a failure of an automatic transmission for an automobile, and, more particularly, to a method of and a system for making a decision on a failure of an automatic transmission in gear shift to an intended gear.

2. Description of Related Art

A multiple speed transmission gear mechanism of an automatic transmission equipped with a torque converter is typically connected to an engine through the torque converter. Gear shifts of the automatic transmission are completed by selectively actuating a plurality of electromagnetic solenoids to hydraulically lock and unlock friction coupling elements, such as brakes and clutches, so as to create desired power transmission paths of the multiple transmission gear mechanism. Specifically, control signals are generated and selectively actuate the electromagnetic solenoids according to predetermined gear shift patterns selected on the basis of driving conditions.

Automatic transmissions of this kind possibly encounter failures that an expected or target gear is not created for some reasons or others. A decision on an occurrence of such a shift failure, which is always one of matters of importance for safety drive, can be made by a comparison between a theoretical turbine speed, theoretically determined based on a vehicle speed and a target gear, and an actual turbine speed. If the automatic transmissions are equipped with turbine speed sensors, the failure decision is easy and accurate. However, in some cases where the automatic transmission is not equipped with a turbine speed sensor, a matter of great importance is how to decide an occurrence of a shift failure and how accurately the failure decision is made.

One of approaches to making a failure decision is to estimate a turbine speed on the basis of an engine speed and a speed ratio e of the torque converter. The torque converter speed ratio e, i.e. a speed ratio between a turbine speed and a pump speed, is obtained from a speed ratio map established in relation to input torque coefficient T as a parameter which is an engine output torque T divided by a square of the engine speed NE. In this instance, the engine output torque T is obtained from a torque map established in relation to engine throttle opening TVO and engine speed NE. Such a technique is known from, for instance, Japanese Unexamined Patent Publication No. 6(1994)-331020.

This technique taught by the Japanese Unexamined Patent Publication No. 6(1994)-331020 does, however, not always provide an accurate and reliable decision on an occurrence of a failure in gear shift. This is because the estimate for a turbine speed necessities a number of mathematical calculations and experiments errors in various parameters, such as the temperature and pressure of an operating oil in the multiple transmission gear mechanism.

SUMMARY OF THE INVENTION

It is an object of the present invention to provide a method of making an accurate and reliable decision on a failure in shifting an automatic transmission equipped with no a turbine speed sensor to a target gear.

It is another object of the present invention to provide a failure decision system for making a decision on a failure in shifting an automatic transmission equipped with no a turbine speed sensor to a target gear.

These objects of the present invention are achieved by providing a failure decision system for making a decision of operational failure of an automatic transmission which is comprised of a torque converter and a multiple speed transmission gear mechanism, the automatic transmission automatically shifting to target gears selected according to predetermined shift patterns on the basis of driving conditions. In the failure decision, slippage theoretically caused in said torque converter is estimated on the basis of an engine speed and a turbine speed of the torque converter theoretically determined for a target gear selected according to the vehicle speed, and is compared with predetermined reference slippage. When the estimated slippage exceeds the predetermined threshold slippage, it is decided that there has occurred a wrong shift to a gear other than the target gear.

Slippage actually caused in the torque converter does not exceed the theoretical maximum slippage which alters according to vehicle speeds and also according to gears even when the vehicle speed does not change. If the automatic transmission shifts to a wrong gear other than the target gear, for instance to a gear lower than the target gear, the estimated slippage exceeds the maximum slippage. On the basis of this fact, a gear shift failure is precisely and easily found with the utilization of the maximum slippage as a reference or threshold value.

On the other hand, if the automatic transmission shifts to a wrong gear higher than the target gear, the estimated slippage is attained as a minus value which is the difference of an engine speed from an estimated turbine speed which is higher than the engine speed. On the basis of this fact, with the utilization of the minus slippage as a reference or threshold value, a gear shift failure is precisely and easily found.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF SPECIFIC EMBODIMENTS

Because multiple transmission gear mechanisms and torque converters are well known in the art, the present description will be directed in particular to elements forming part of, or cooperating directly with, an apparatus or a system in accordance with the present invention. It is to be understood that elements not specifically shown or described can take various forms well known to a person skilled in the automobile art.

Figure 1:
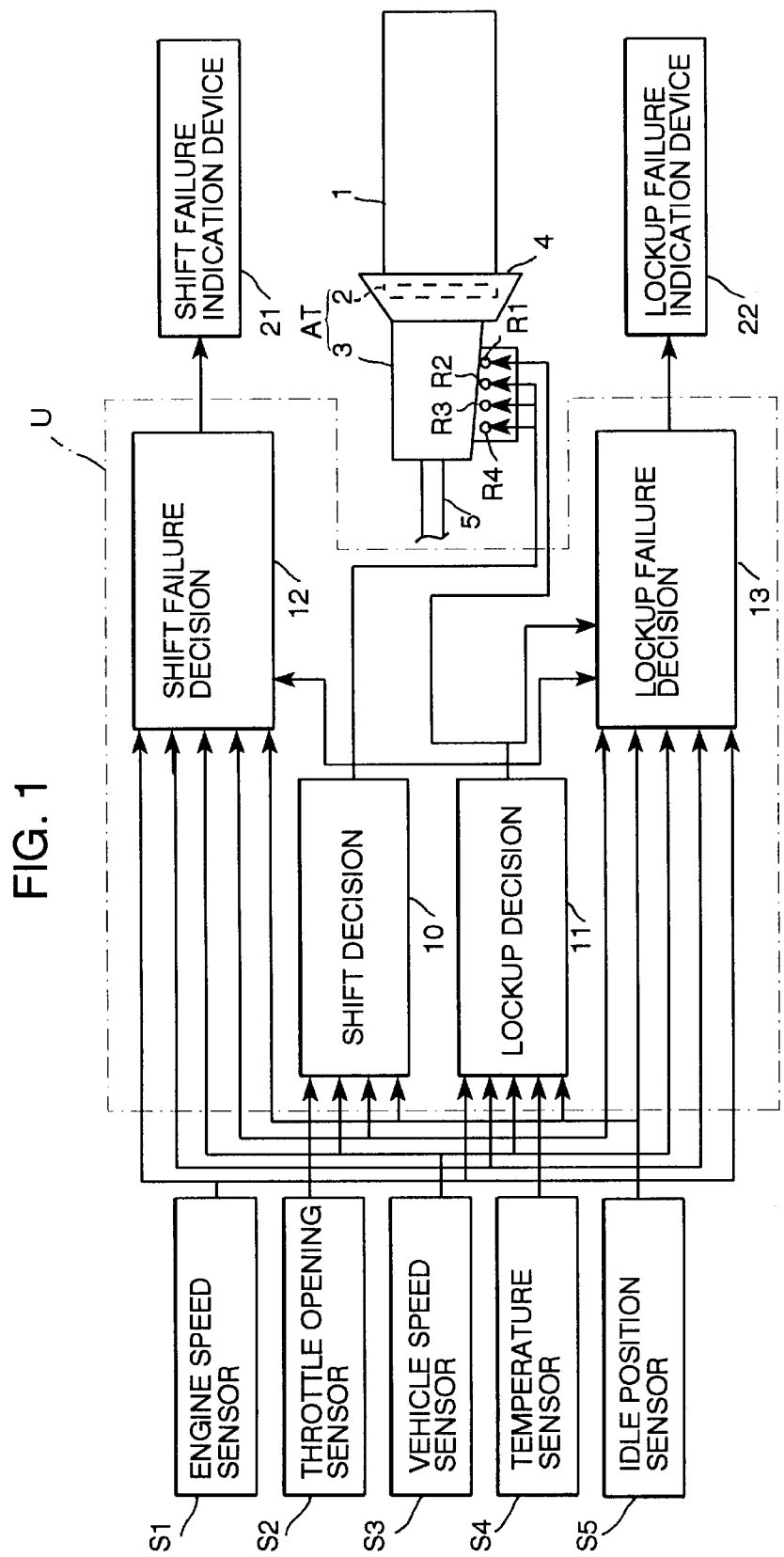
FIG. 1 is a block diagram of a failure decision system in accordance with a particular embodiment of the present invention.

Referring to the drawings in detail, and more particularly to FIG. 1, an automatic transmission AT is comprised of a multiple transmission gear mechanism 3 of a type having a planetary gearset and a torque converter 2 through which the multiple transmission gear mechanism 3 is connected to an engine 1 and which differentially transmits the engine output torque to the multiple transmission gear mechanism 3. This torque converter 2 is equipped with a hydraulically operated lockup clutch 4 for mechanically coupling input and output shafts, i.e. an engine output shaft to which the pump is fastened and a transmission input shaft to which the turbine is fastened, together. The lockup clutch 4 is locked and unlocked by turning on and off a lockup control electromagnetic valve R1. Multiple transmission gear mechanism 3 includes a plurality of hydraulically operated friction coupling elements, such as brakes and clutches, which are selectively locked and unlocked to create various power transmission paths and thereby to shift the automatic transmission AT to desired forward gears. Locking and unlocking of the friction coupling elements are caused by various predetermined combinations of actuation of shift control electromagnetic valves R2–R4. The automatic transmission AT is of, for instance, having four forward gears and a reverse gear. A control unit U comprised mainly of a microcomputer U receives signals from various sensors and controls actuation of these electromagnetic valves R1–R4. These sensors include at least a speed sensor S1 for detecting a rotational speed NE of the engine 1 and providing an engine speed signal, a load sensor S2 for detecting a position or opening TVO of an engine throttle as an engine load and providing a position signal, a speed sensor S3 for detecting a vehicle speed NV and providing a vehicle speed signal, a temperature sensor S4 for detecting the temperature THO of an operating oil in the Automatic transmission AT, and an idle sensor S5 for detecting an idle state of the engine 1. The vehicle speed sensor S3 may practically detect the rotational speed of driven wheels, or otherwise the rotational speed of an output shaft 5 of the automatic transmission AT. The idle sensor S5 may be comprised of a switch which turns on following releasing an acceleration pedal.

Control unit U is comprised of functional sections, such as a shift decision section 10, a lockup decision section 11, a shift failure decision section 12 and a lockup failure decision section 13, into which the microcomputer is divided not practically but conceptually. The control unit U further includes memories such as a read only memory (ROM) and a random access memory (RAM) for storing data on lockup control patterns and maximum slippage allowable for the torque converter 2 to cause according to vehicle speeds and gears and other necessary data.

Shift decision section 10 decides a target gear to which the automatic transmission AT must be shifted on the basis of predetermined gear shift patterns and provides the shift control electromagnetic valves R2–R4 with shift command signals. The gear shift patterns define gears to be selected according to combinations of, for instance, throttle opening and vehicle speeds as parameters. The lockup decision section 11 decides whether or not the lockup clutch 4 must be locked on the basis of a predetermined lockup pattern and provides the lockup control electromagnetic valve R1 with a lockup command signal. For example, the lockup pattern defines a lockup range of vehicle speeds for locking the lockup clutch 4 on condition that the automatic transmission AT is in, for instance, a fourth gear.

Shift failure decision section 12 makes a decision as to whether the automatic transmission AT has successfully been shifted to a target gear. In the case where there is an occurrence of a wrong gear shift to a gear other than the target gear, the shift failure decision section 12 provides a failure signal with which a warning device 21, such as a buzzer and a lump, raises a warning. The lockup failure decision section 13 makes a decision of an occurrence of a failure that the lockup clutch 4 is left unlocked even at the presence of a lockup command signal is present and, if in fact there is an occurrence of a failure of the lockup clutch 4, provides a failure signal with which a warning device 22, such as a buzzer and a lump, raises a warning.

Figure 9:
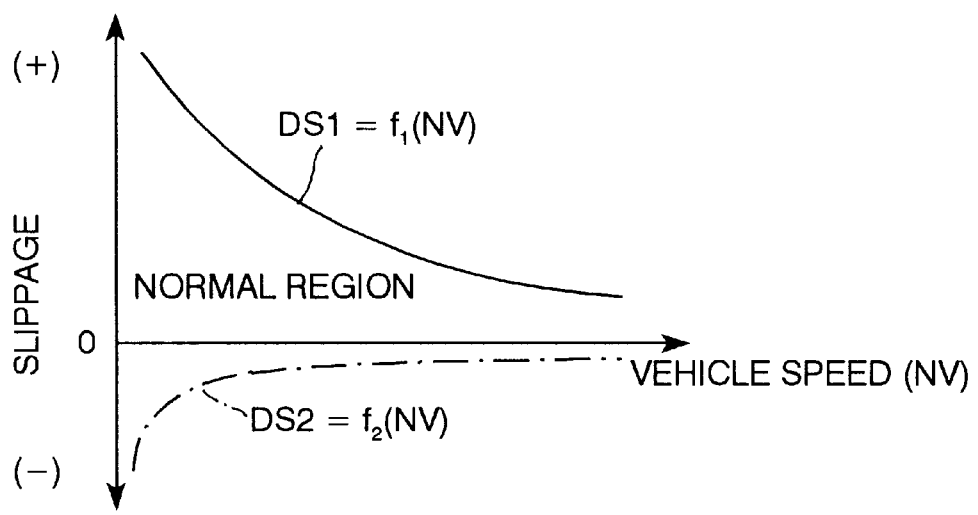
FIG. 9 is a graph of maximum slippage allowable for the torque converter to cause.
Figure 10:
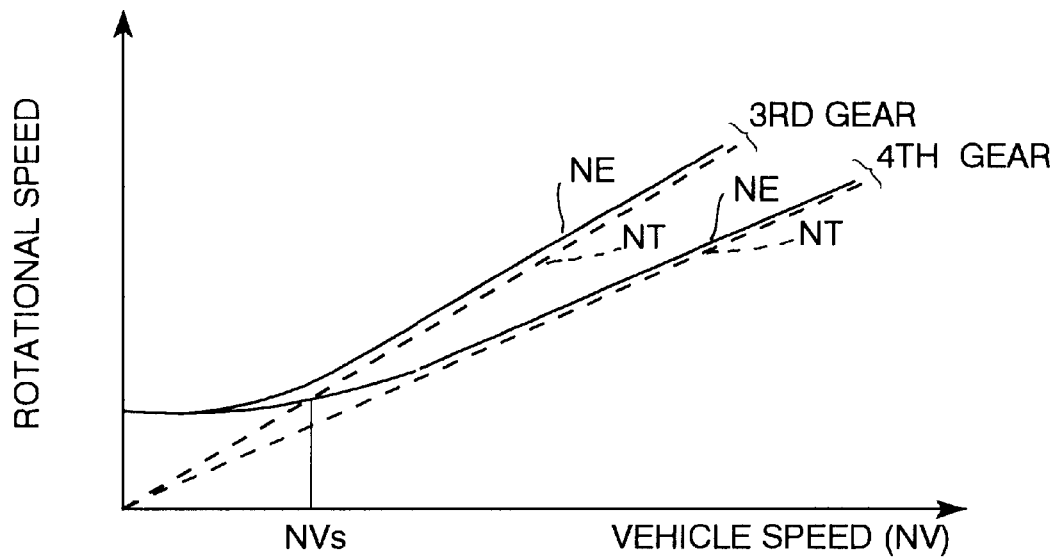
FIG. 10 is a graph for explaining the principle of making the failure decision.

The principle of the failure decision will be attained by reference made to FIGS. 9 and 10. FIG. 9 shows a map of maximum slippage which the torque converter 2 is allowed to produce at various vehicle speeds. The maximum allowable slippage map is provided for each available gear and established such that the maximum allowable slippage declines with an increase in vehicle speed. FIG. 10 shows changes in engine speed NE and turbine speed NT in relation to vehicle speeds NV. As shown, slippage represented by a difference of the engine speed NE from the turbine speed NT becomes smaller with an increase in vehicle speed NV and attains a small and constant value in a range of vehicle speeds NV higher than a certain vehicle speed. The turbine speed NT for a specific gear is theoretically obtained as an estimated turbine speed NT on the basis of a vehicle speed NV and a gear ratio of the whole drive system when the automatic transmission AT is placed in the specific gear.

When estimated slippage at a vehicle speed NV obtained as the difference between an engine speed NE and an estimated turbine speed NT is greater than the maximum slippage at the vehicle speed NV, it is assumed that the automatic transmission AT has been shifted to a wrong gear different from the target gear due to a some failure or other. In this failure, the wrong gear is slower than the target gear. Specifically, considering that the automatic transmission AT has practically been shifted not to a fourth gear as the target gear but to a third gear when the vehicle is running at a speed greater than a specific vehicle speed NVs, namely a vehicle speed $NVs_4$ assigned to the fourth gear, as shown in FIG. 10 which will be described in detail later, the engine speed NE accords to the practically provided third gear and is greater than that attained in the fourth gear, and the estimated turbine speed NT in the target fourth gear is significantly smaller than the turbine speed NT in the third gear. In such a way, in cases where a gear practically created is lower than a target gear, because of a larger engine speed NE and a smaller estimated turbine speed NT, the estimated slippage exceeds greatly over the maximum allowable slippage shown in FIG. 9. On the other hand, in cases where a gear practically created is higher than a target gear, the estimated slippage takes a minus value. That is, an occurrence of the estimation of a minus value of slippage signifies a wrong shift to a gear higher than the target gear. For instance, if a gear shift occurs to a fourth gear different from the target gear, for instance a third gear, whenever the vehicle is running at a speed greater than the specific vehicle speed NVs, namely a vehicle speed $NVs_3$ assigned to the third gear, the engine speed NE is lower according to the fourth gear and the estimated turbine speed NT is greater according to the target third gear for which the estimated slippage takes a minus value.

The specific vehicle speed NVs is a speed provided when the turbine speed at a certain target gear, for instance the third gear, is equal to the engine speed when the automatic transmission AT is placed at a gear one step higher than the target gear. Because the engine speed NE at the fourth gear is higher than the turbine speed at the third gear, if the vehicle speed is lower than the specific speed NVs, an accurate and reliable failure decision is hard to take place normally. In such cases, the execution of failure decision and withdrawal of the decision of failure are interrupted whenever the vehicle speed is in a range less than the specific vehicle speed NVs.

The operation of the failure decision system depicted in FIG. 1 is best understood by reviewing FIGS. 2–5, which are a flowchart illustrating a sequence routine of the shift failure decision for the microcomputer, in particular the shift failure decision section 12, of the control unit U. Programming a computer is a skill well understood in the art. The following description is written to enable a programmer having an ordinary skill in the art to prepare an appropriate program for the microcomputer. The particular details of such a program would of course depend upon the architecture of the particular computer selected.

The flowchart logic commences and control passes directly to a function block at step Q1 where various signals from the sensors S1–S5, which represent a vehicle speed NV, an engine speed NE, throttle opening TVO and an oil temperature THO, respectively, are input. After a determination of a target gear TG according to an appropriate shift pattern selected based on the vehicle speed NV and throttle opening TVO at step Q2, various threshold values, namely first to fourth threshold times T1–T4 and first and second threshold slippage DS1 and DS2, are subsequently determined according to the target gear TG at steps Q3 through Q9. These threshold times T1–T4 are used to make a failure decision. Specifically, the threshold times T1 and T3 are used in connection with a decision on a wrong shift to a gear lower than the target gear and a withdrawal of the decision of failure, respectively. Similarly, the threshold times T2 and T4 are used for a failure decision on a wrong shift to a gear higher than the target gear and a withdrawal of the decision of failure, respectively. In consideration of a time for which each gear is continuously used, each threshold time T1–T4 is generally established to be shorter as the target gear becomes lower. Specifically, in this embodiment, while the threshold times T1 and T2 are invariable, the threshold times T3 and T4 are variable such that they becomes shorter with an increase in vehicle speed NV and with an increase in throttle opening TVO. The threshold values DS1 and DS2, which, as was previously described, indicate the maximum allowable slippage as shown in FIG. 9, are used for making a decision of a wrong shift to a gear lower than a target gear and a decision of a wrong shift to a gear higher than a target gear, respectively. The threshold slippage DS2, which takes a minus value, is established to be slightly smaller as shown by a dotted broken line in FIG. 9 in order to avoid wrong decisions.

When the first gear (1st) is selected as the target gear at step Q3, the threshold values T1–T4 and DS1 and DS2 are set at step Q4. Specifically, timers TS11 and TS12 are set to the threshold times T1 and T2 for making a failure decision concerning the target first gear (1ST), and timers TR11 and TR12 are set to threshold times T3 and T4 for withdrawing the decision of failure concerning the target first gear (1ST). Together, the threshold slippage DS1 and DS2 are set to maximum slippage as functions of vehicle speed $f_{11}(NV)$ and $f_{12}(NV)$ assigned to the target first gear. In the same manner, the threshold values T1–T4 and DS1 and DS2 are set at step Q6 when the second gear (2ND) is selected as the target gear at step Q5, at step Q8 when the third gear (3RD) is selected as the target gear at step Q7, and at step Q9 when the fourth gear (4TH) is selected as the target gear.

Figure 8:
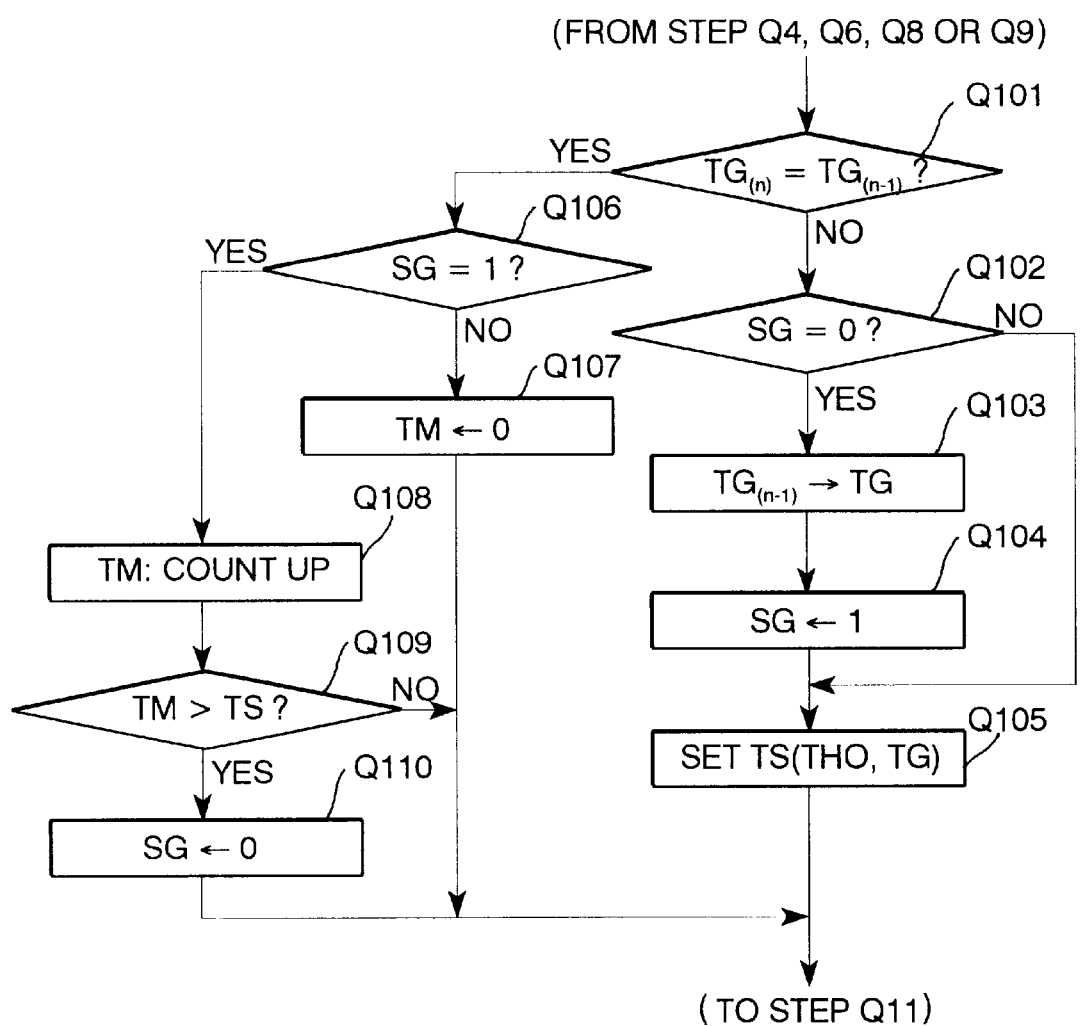
FIG. 8 is a flowchart illustrating a sequence subroutine of the decision as to whether a gear shift is taking place.

Thereafter, decisions are consecutively made regarding required conditions for the failure detection at steps Q10 through Q12. Specifically, a subroutine shown in FIG. 8 is called at step Q10 to make a decision as to whether a gear shift to the target gear TG is taking place. If the answer is "NO," another decision is made at step Q11 as to whether the throttle opening TVO is equal to or less than a limit value TVOx which is exceeded during deceleration. In place of throttle opening, it may be decided as to whether the idle switch S5 has been turned on. If the answer is "NO," a further decision is made at step Q12 as to whether the oil temperature THO is lower than a limit value THOx. The oil temperature is one of factors governing a period of time for achieving a gear shift. If the answer is "NO," the shift failure decision sequence routine proceeds to further steps. However, if any one of the required conditions is not satisfied, the shift failure decision sequence routine returns without executing the failure decision.

Figure 3:
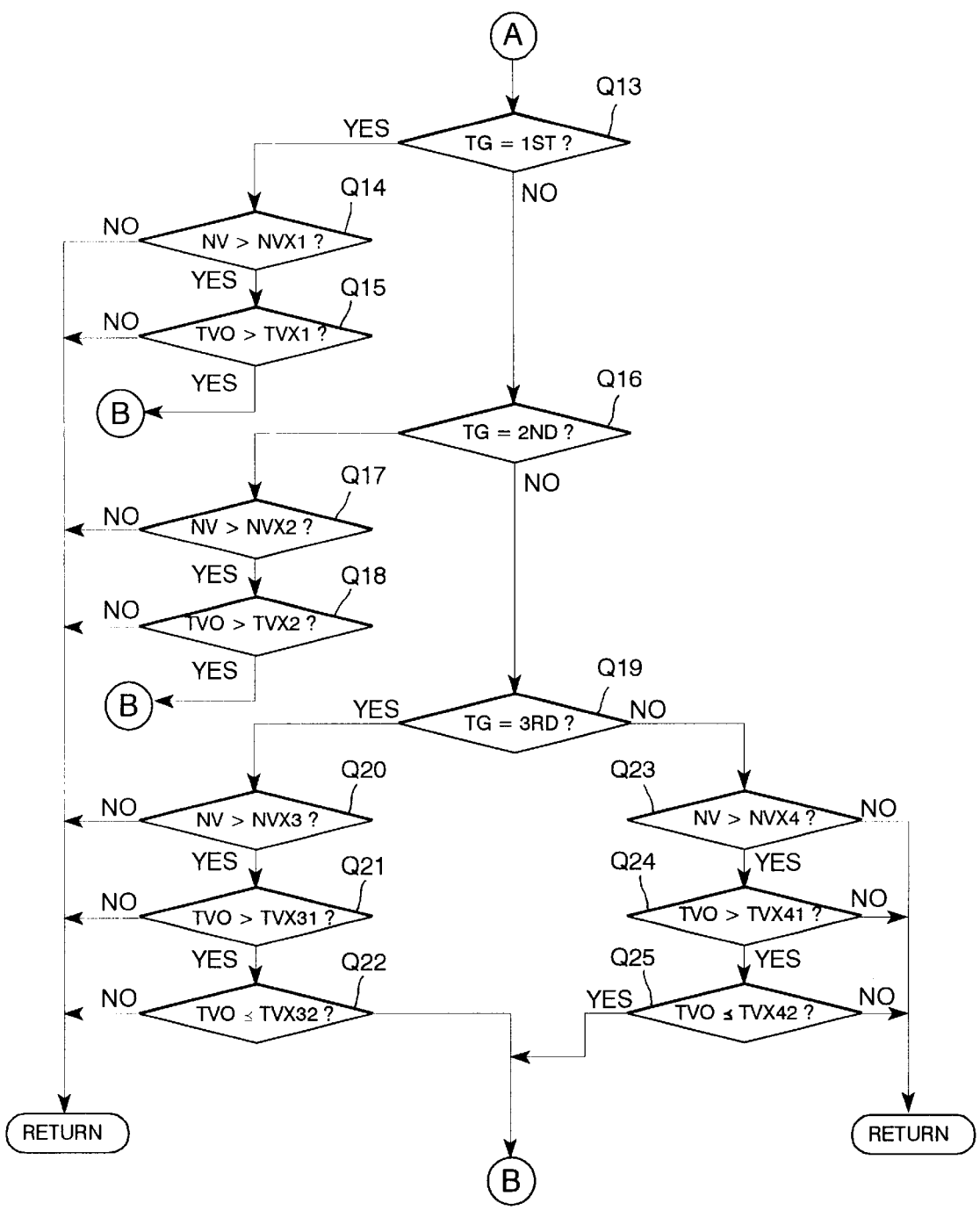

At steps Q13 through Q25 in FIG. 3, decisions are made regarding further required conditions for the failure detection. Specifically, in the case where the first gear (1ST) is selected as the target gear (TG), the shift failure decision is executed only when the vehicle speed NV and the throttle opening TVO exceed a first specified vehicle speed NVX1 and a first specified throttle opening TVOX1, respectively, which are lower limits for allowing execution of the failure decision at the first gear (1ST). The first vehicle speed NVX1 is preferred to be slightly higher than the specific vehicle speed NVs at the first gear shown in FIG. 10. In the case where the second gear (2ND) is selected as the target gear (TG), the shift failure decision is executed only when the vehicle speed NV and the throttle opening TVO exceed a second lower limit vehicle speed NVX2 and a second lower limit throttle opening TVOX2, respectively. The second lower limit vehicle speed NVX2 is also preferred to be slightly higher than the specific vehicle speed NVs at the second gear. If these conditions on vehicle speed and throttle opening are not satisfied, the shift failure decision sequence routine returns without executing the shift failure decision. In the case where the third gear (3RD) is selected as the target gear (TG), the shift failure decision is executed only when the vehicle speed NV exceeds a third lower limit vehicle speed NVX3 and the throttle opening TVO is between a third lower limit throttle opening TVOX31 and a first upper limit throttle opening TVOX32.

Further, in the case where the fourth gear (4TH) is selected as the target gear (TG), the shift failure decision is executed only when the vehicle speed NV exceeds a fourth lower limit vehicle speed NVX4 and the throttle opening TVO is between a fourth lower limit throttle opening TVOX41 and a second upper limit throttle opening TVOX42. The upper limit throttle openings are used to conduct the failure decision only in a range of drive conditions which are frequently satisfied at the third gear and at the fourth gear, respectively.

In this instance, the lower the target gear is, the greater the limit throttle opening is, and, on the other hand, the higher the target gear is, the greater the lower limit vehicle speed is.

When all of the required conditions for the failure detection are satisfied, a decision is made as to whether a wrong shift to a gear lower than the target gear has occurred.

Figure 4:
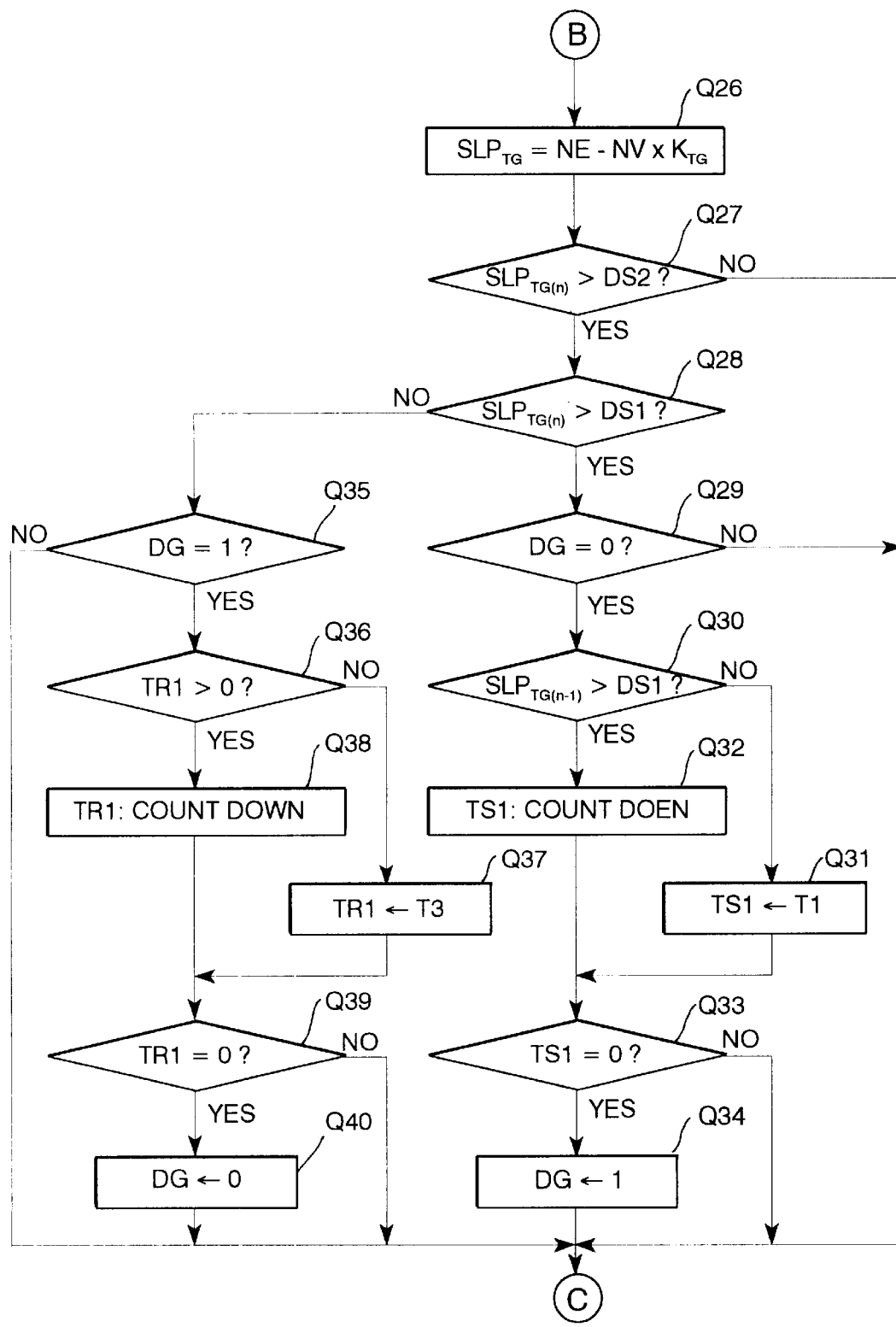

Specifically, at step Q26 in FIG. 4, current estimated slippage $SLP_{TG(n)}$ allowable for the target gear TG is calculated as a difference between engine speed NE and estimated turbine speed NT from the following equation:

$$SLP_{TG}=NE-NV \times K_{TG}$$

where $K_{TG}$ is the coefficient assigned to the specific target gear TG and corresponds to a gear ratio of the entire drive system when the target gear TG is selected.

Subsequently, a decision is made at step Q27 as to whether the current estimated slippage $SLP_{TG(n)}$ is greater than the second threshold value DS2. If greater, another decision is made at step Q28 as to whether the current estimated slippage $SLP_{TG(n)}$ is greater than the first threshold value DS1. If the answer to the decision made at step Q28 is "YES," this indicates that the gear shift has been wrongly made to a lower gear, then, a decision is subsequently made at step Q29 as to whether a wrong shift flag DG has been set to a state of "0". In this instance, the wrong shift flag DG set to the state of "0" indicates that there has occurred no wrong shift to a lower gear. If the answer to the decision made at step Q29 is "YES," then, a decision is made at step Q30 as to whether the last estimated slippage $SLP_{TG(n-1)}$ is greater than the first threshold value DS1. If the answer to the decision is "NO," this indicates that the first threshold value DS1. If the answer to the decision is "NO," this indicates that the first threshold value DS1 is currently exceeded for the first time, then, the timer TS1 (TS11, TS21, TS31 or TS41) resets its initial count to the shift failure decision threshold time T1 at step Q31. On the other hand, if the answer to the decision is "YES," this indicates that the first threshold slippage has already been exceeded, then, the timer TS1 changes its count by a decrement of one at step Q32. Subsequently, a decision is made at step Q33 as to whether the timer TS1 has counted down the shift failure decision threshold time T1 to zero. At an early time, since the answer to the decision is "NO," the shift failure decision sequence routine proceeds to further steps. When the answer to the decision at step Q33 is "YES," this indicates that a wrong shift to a lower gear has continued for the shift failure decision threshold time T1, then, the wrong shift flag DG is set to a state of "1" at step Q34. If the answer to the decision made at step Q27 or at step Q29 is "NO," then, the shift failure decision sequence routine proceeds to further steps skipping steps Q28–Q34 or steps Q30–Q34, respectively.

If the first threshold slippage DS1 is exceeded, that is, the answer to the decision made at step Q28 is "YES," a decision is made at step Q35 as to whether the wrong shift flag DG has been set to the state of "1". If the answer to the decision is "NO," this indicates that withdrawal of the decision of failure is not necessary, then, the shift failure decision sequence routine proceeds to further steps skipping steps Q36–Q40. On the other hand, if the answer to the decision is "YES," the shift failure decision time is appropriately set through subsequent steps Q36–Q40. Specifically, a decision is made at step Q36 as to whether a timer TR1 (TR11, TR21, TR31 or TR41) has counted down the shift failure withdrawal threshold time T3 to zero. After having reset the timer TR1 to the shift failure withdrawal threshold time T3 at step Q37 if the answer to the decision at step Q36 is "YES," or after having changed the count of the timer TR1 by a decrement of one at step Q38 if the answer to the decision at step Q36 is "NO," a decision is made at step Q39 as to whether the timer TR1 has counted down to zero. At an early time, since the answer to the decision is "NO," the shift failure decision sequence routine proceeds to further steps. When the answer to the decision at step Q39 is "YES," the wrong shift flag DG is reset to the state of "0" at step Q40. Withdrawal of the decision of failure, in other words resetting the wrong shift flag DG to the state of "0," is executed through steps Q36–Q40 when slippage $SLP_{TG}$ is continuously estimated to be less than the first threshold slippage DS1 for the time TR1.

Figure 5:
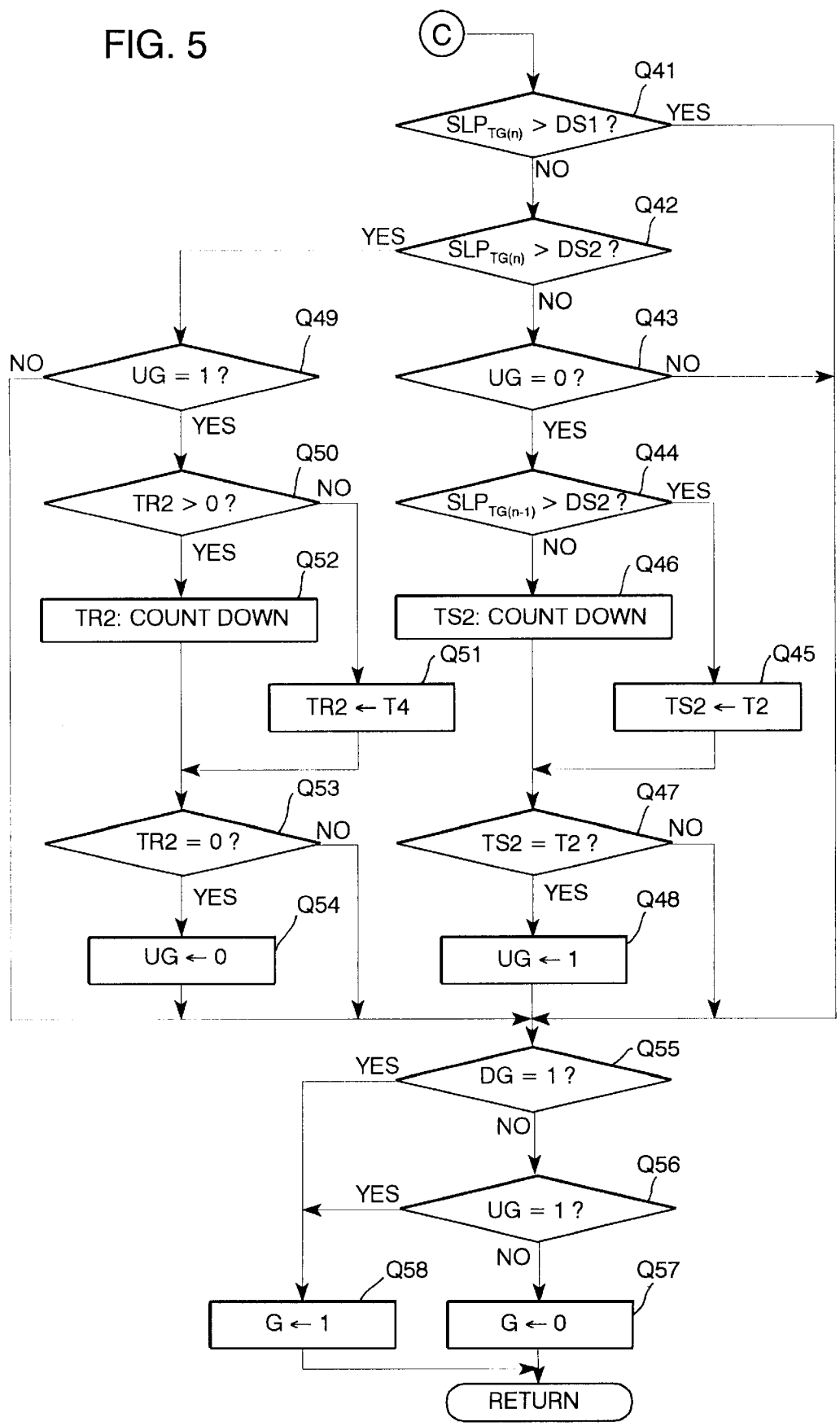

Thereafter, at steps Q41 through 57 in FIG. 5, a decision concerning a wrong shift to a higher gear is made, in other words, setting or resetting a wrong shaft flag UG relating to a wrong shift to a gear higher than a specific target gear is executed. Specifically, a decision is made at step Q41 as to whether the estimated slippage $SLP_{TG}$ allowable for the target gear is greater than the first threshold slippage DS1. If smaller, another decision is made at step Q42 as to whether the estimated slippage $SLP_{TG}$ is greater than the second threshold slippage DS2. If the answer to the decision made at step Q42 is "NO," a decision is subsequently made at step Q43 as to whether the wrong shift flag UG has been set to a state of "0". In this instance, the wrong shift flag UG set to the state of "0" indicates that there has been no occurrence of a wrong shift to a higher gear. If the answer to the decision made at step Q43 is "YES," then, a decision is made at step Q44 as to whether the last estimated slippage $SLP_{TG(n-1)}$ is greater than the second threshold value DS2. If the answer to the decision is "YES," the timer TS2 (TS12, TS22, TS32 or TS42) resets its initial count to the shift failure decision threshold time T2 at step Q45. On the other hand, if the answer to the decision is "NO," the timer TS2 changes its count by a decrement of one at step Q46. Subsequently, a decision is made at step Q47 as to whether the timer TS2 has counted down the shift failure decision threshold time T2 to zero. If the answer to the decision at step Q47 is "YES," this indicates that a wrong shift to a higher gear has continued for the shift failure decision threshold time T2, then, the wrong shift flag UG is set to the state of "1" at step Q48. After having set the wrong shift flag UG to the state of "1" at step Q48 or if the answer to the decision made at step Q47 is "NO," the shift failure decision sequence routine proceeds to a decision at step Q55. Also, the "YES" answer to the decision at step Q41 or the "NO" answer to the decision at step Q43 calls directly a decision at step Q55 skipping steps Q42–Q54 or steps Q44–Q48, respectively. Summarizing the above operation caused through steps Q42–Q48, when the slippage $SLP_{TG}$ is continuously estimated to be less than the second threshold slippage DS2 which assumes a minus value for the shift failure decision threshold time T2, the wrong shift flag UG is set to the state of "1" which indicates an occurrence of a wrong shift to a gear higher than the target gear.

If the second threshold slippage DS2 is exceeded, that is, the answer to the decision made at step Q42 is "YES," a decision is made at step Q49 as to whether the wrong shift flag UG has been set to the state of "1". If the answer to the decision is "NO," the shift failure decision sequence routine proceeds directly to step Q55 skipping steps Q50 through Q54. On the other hand, if the answer to the decision is "YES," a decision is made at step Q50 as to whether a timer TR2 (TR12, TR22, TR32 or TR42) has counted down to zero. After having reset the timer TR2 to the shift failure withdrawal threshold time T4 at step Q51 if the answer to the decision at step Q50 is "YES," or after having changed the count of the timer TR2 by a decrement of one at step Q52 if the answer to the decision at step Q50 is "NO," a decision is made at step Q53 as to whether the timer TR2 has counted down the shift failure withdrawal threshold time T4 to zero. If the answer to the decision is "NO," the shift failure decision sequence routine proceeds directly to step Q55. When the answer to the decision at step Q53 is "YES," the wrong shift flag UG is set to the state of "0" at step Q54. Summarizing the above operation caused through steps Q49–Q54, when the slippage $SLP_{TG}$ is continuously estimated to be greater than the second threshold value DS2 which assumes a minus value for the shift failure withdrawal threshold time T4, the wrong shift flag UG is set to the state of "0" which indicates that there is no occurrence of a wrong shift to a gear higher than the target gear.

Finally, decisions are made as to the states of the wrong shift flags DG and UG at steps Q55 and Q56, respectively. At least one of the wrong shift flags DG and UG assumes the state of "1," at step Q58, a shift failure flag G is set to a state of "1" which actuates the warning device 21 to indicate an occurrence of a shift failure of the automatic transmission. On the other hand, if both wrong shift flags DG and UG assume the state of "1" at step Q58, the shift failure flag G is set to a state of "1" which indicates that there is no occurrence of a shift failure of the automatic transmission.

Figure 6:
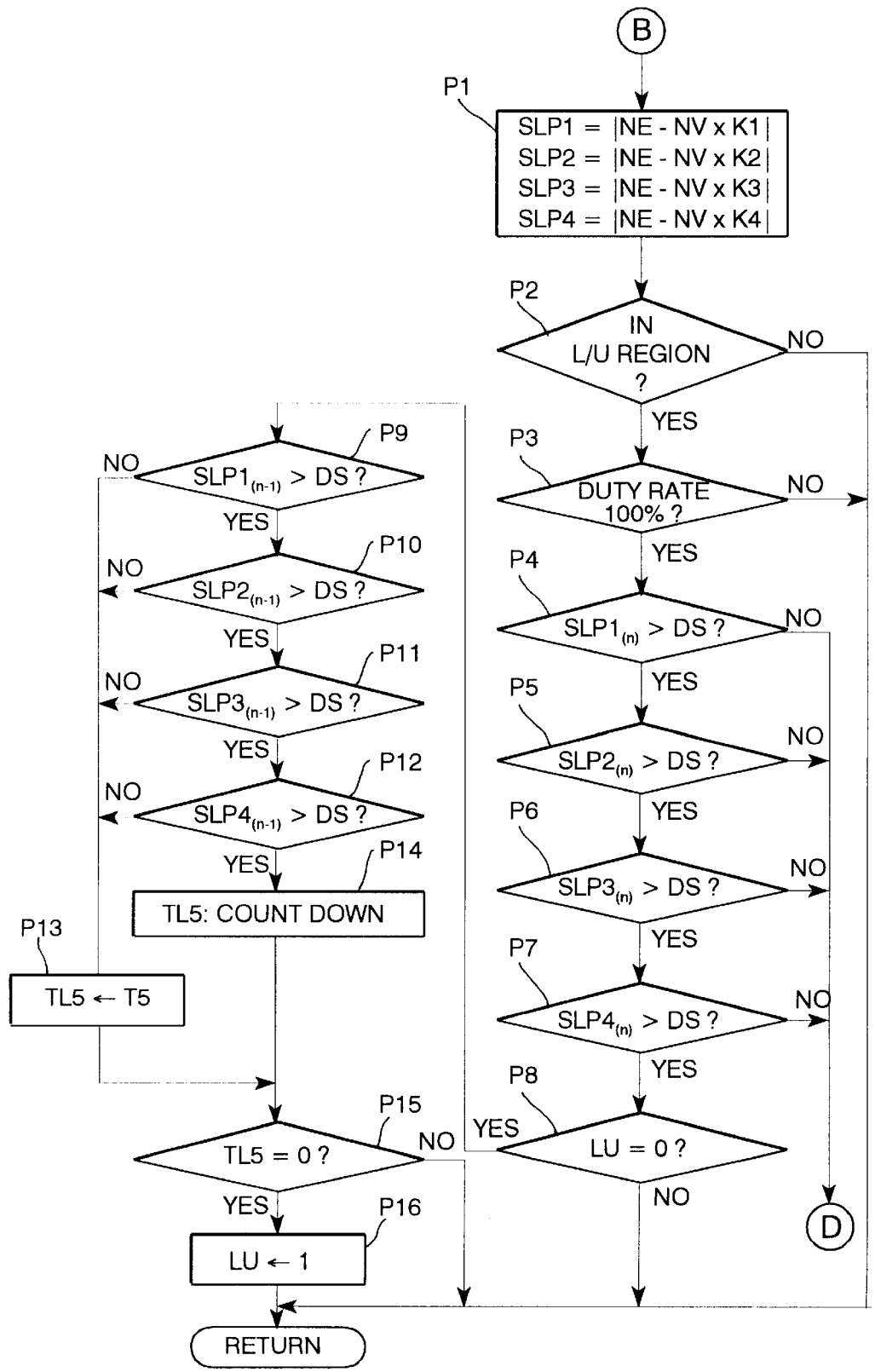
Figure 7:
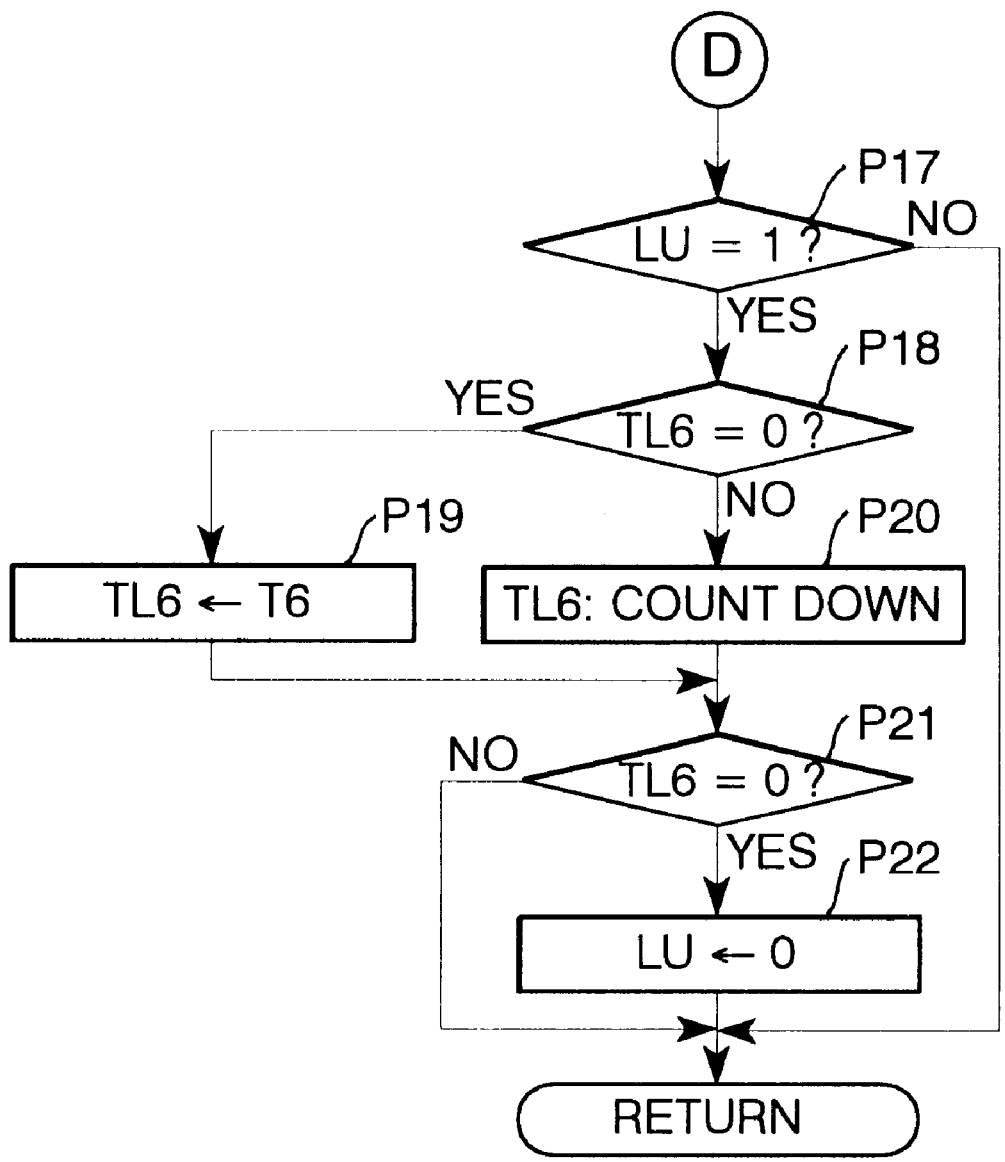

FIGS. 6 and 7 are a flowchart illustrating a sequence routine of the lockup failure decision for the microcomputer, in particular the lockup failure decision section 13, of the control unit U.

The first step in FIG. 6 is to calculate estimated slippage SLP1–SLP4 allowable for the first to fourth gears G1–G4, respectively, at step P1, following step Q22 or Q25 in FIG. 3.

The estimated slippage SLPn allowable for the specific gear Gn is calculated as a difference between engine speed and estimated turbine speed from the following equation:

$$SLPn = NE - NV \times Kn$$

where K is the coefficient assigned to the specific gear Gn and corresponds to a gear ratio of the entire drive system when the gear Gn is selected.

Subsequently, a decision is made at step P2 as to whether the driving condition is within a predetermined lockup (L/U) region. If it is out of the lockup (L/U) region, the lockup failure decision sequence routine returns without executing further steps for the lockup failure decision. If it is within the lockup (L/U) region, a decision is made at step P3 as to whether a lockup command signal provided for the lockup control electromagnetic valve R1 has a duty rate of 100%. In this instance, the lockup command signal of a 100% duty rate causes the lockup control electromagnetic valve R1 to operate so as to lock perfectly the lockup clutch 4. If it has not a 100% duty rate, the lockup failure decision sequence routine returns without executing further steps for the lockup failure decision.

If in fact the lockup command signal has a 100% duty rate, decisions are made as to whether the current estimated slippage $SLP1_{(n)}$–$SLP4_{(n)}$ are greater than a threshold value DS at steps P4 through P7, respectively. If all of the estimated slippage SLP1–SLP4 are greater than the threshold value DS, this indicates that the lockup clutch 4 produces some slippage, then, a decision is made at step P8 as to whether a lockup failure flag LU has been set to a state of "0" which indicates that the lockup clutch 4 is successfully locked up. If the answer to the decision is "YES," decisions are made at steps P9 through P12 as to whether the last estimated slippage $SLP1_{(n-1)}$–$SLP4_{(n-1)}$ are greater than the threshold value DS at steps P9 through P12, respectively. If any one of the last estimated slippage $SLP1_{(n-1)}$–$SLP4_{(n-1)}$ is less than the threshold value DS, this indicates that a lockup failure has currently occurred for the first time, then, a timer TL5 resets its initial count to the lockup failure decision threshold time T5 at step P13. In this instance, although the threshold value DS may theoretically assume zero (0), it is established to be slightly greater than slippage which possibly occurs due to changes of the diameters of wheels resulting from wear and other factors while the lockup clutch 4 is completely locked. On the other hand, if the answers to all of the decisions at steps P9 through P12 are "YES," the timer TL5 changes its count by a decrement of one at step P14. After having reset the initial count at step P13 or having changed the timer count at step P14, a decision is made at step P15 as to whether the timer TL5 has counted down to zero (0). At an early time, since the answer to the decision is "NO," the lockup failure decision sequence routine returns without executing further steps for the lockup failure decision. When the answer to the decision is "YES," the lockup failure flag LU is set to a state of "1" which actuates the warning device 21 to indicate an occurrence of a lockup failure of the automatic transmission. As described above, when the slippage for the first to fourth gears are estimated to be greater than the threshold value DS for the lockup failure decision threshold time T5, it is determined that there has occurred a lockup failure.

In the case where the answer to any one of the decisions made at steps P4 through P7 is "NO," the lockup failure decision sequence routine skips steps P8 through P16 and proceeds directly to step P17 in FIG. 7 where a decision is made as to whether the lockup failure flag LU has been set to the state of "1". If the answer to the decision at step P17 is "NO," this indicates that withdrawal of the result of failure decision is not necessary, then, the lockup failure decision sequence routine returns without executing further steps for the lockup failure decision. However, if the answer to the decision at step P17 is "YES," a decision is made at step P18 as to whether a timer TL6 has counted down to zero (0). If the answer to the decision is "YES," the timer TL6 resets its initial count to the lockup failure decision threshold time T6 at step P19. On the other hand, if the answers to the decision at step P18 is "NO," the timer TL6 changes its count by a decrement of one (1) at step P20. After having reset the initial count at step P19 or having changed the timer TL6 count at step P20, a decision is made at step P21 as to whether the timer TL6 has counted down to zero (0). If the answer to the decision is "NO," the lockup failure decision sequence routine returns without setting the lockup failure flag LU to the state of "0". When the answer to the decision is "YES," the lockup failure flag LU is set to the state of "1" at step P22, and the lockup failure decision sequence routine returns.

Figure 2:
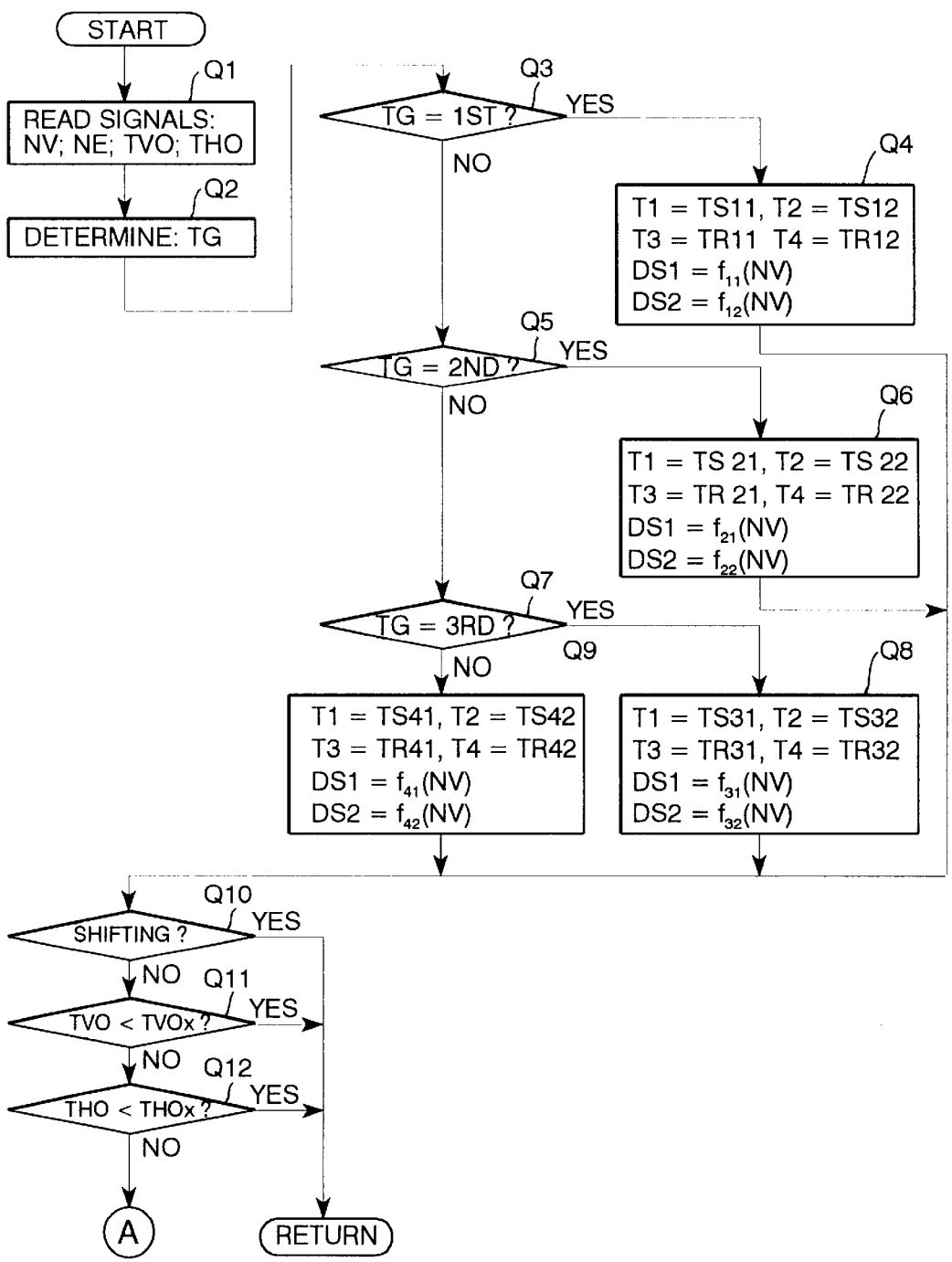
FIGS. 2 through 7 are a flowchart illustrating a sequence routine of executing the method of making a failure decision in accordance with a specific embodiment of the invention.

FIG. 8 is a flowchart illustrating a sequence subroutine of the decision as to whether a gear shift is under execution, which is made at step Q10 of the failure decision sequence routine shown in FIG. 2. The flowchart logic commences and control passes directly to a function block at step Q101 where a decision is made as to whether the current target gear $TG_{(n)}$ is consistent with the last target gear $TG_{(n-1)}$. If these target gears are not consistent with, this indicates that a gear shift takes place, in other words, that a shift command signal is output, then, a decision is subsequently made at step Q102 as to whether a shift flag SG has been set to a state of "0". In this instance, the shift flag SG is set to a state of "1" while a gear shift is under execution and set to the state of "0" when there is no occurrence of a gear shift. At an early time, the answer to the decision made at step Q102 is "YES" and the last target gear $TG_{(n-1)}$ is employed as a target gear TG at step Q103. Subsequently, after having set the shift flag SG to the state of "1" at step Q104, a threshold time TS is established according to the oil temperature THO, the gear TO and the target gear TG$_{(n)}$ at step Q105. In this instance, the threshold time TS is established to be greater as the oil temperature THO increases and as the difference between the gears TG and TG$_{(n)}$ becomes larger.

If the answer to the decision made at step Q101 is "YES," a shift command signal is interrupted and a decision is made at step Q106 as to whether the shift flag SG has been set to the state of "1". If the answer to the decision is "YES," after having changed the count of a shift timer TM by an increment of one (1) at step Q108, a decision is made at step Q109 as to whether the shift timer TM has counted a time greater than the threshold time TS. The answer to the decision is "NO," this indicates that the gear shift has not yet been completed, then, the sequence routine returns. On the other hand, if the answer to the decision is "YES," this indicates that the gear shift has been completed, then, after having reset the shift flag SG to the state of "0" at step Q110, the sequence routine returns. If the answer to the decision made at step Q106 is "NO," after having cleared or reset the shift timer TM to zero (0) at step Q107, the sequence routine returns. As apparent from the above description, the failure decision sequence holds the shift flag SG set to the state of "1" for the threshold time TS even after the interruption of a shift command signal, interrupting the failure decision until slippage becomes stable.

Figure 11:
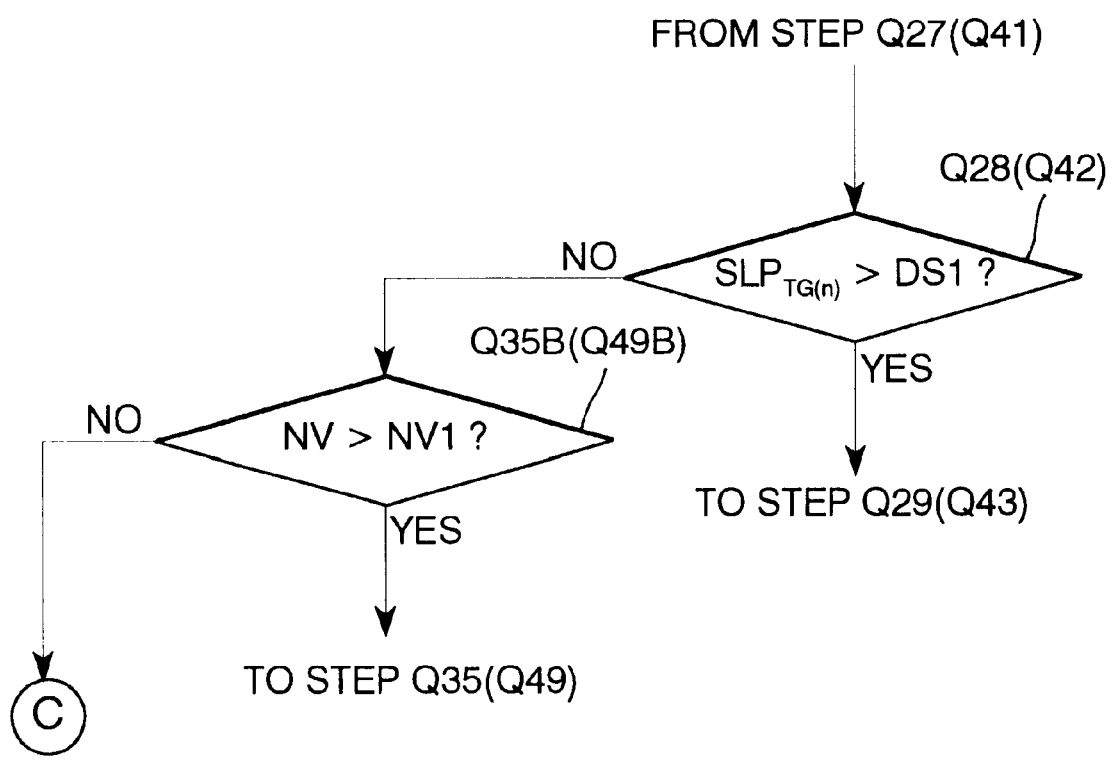
FIG. 11 is part of a flwochart illustrating a sequence routine of executing the method of making a failure decision in accordance with another specific embodiment of the invention.
Figure 12:
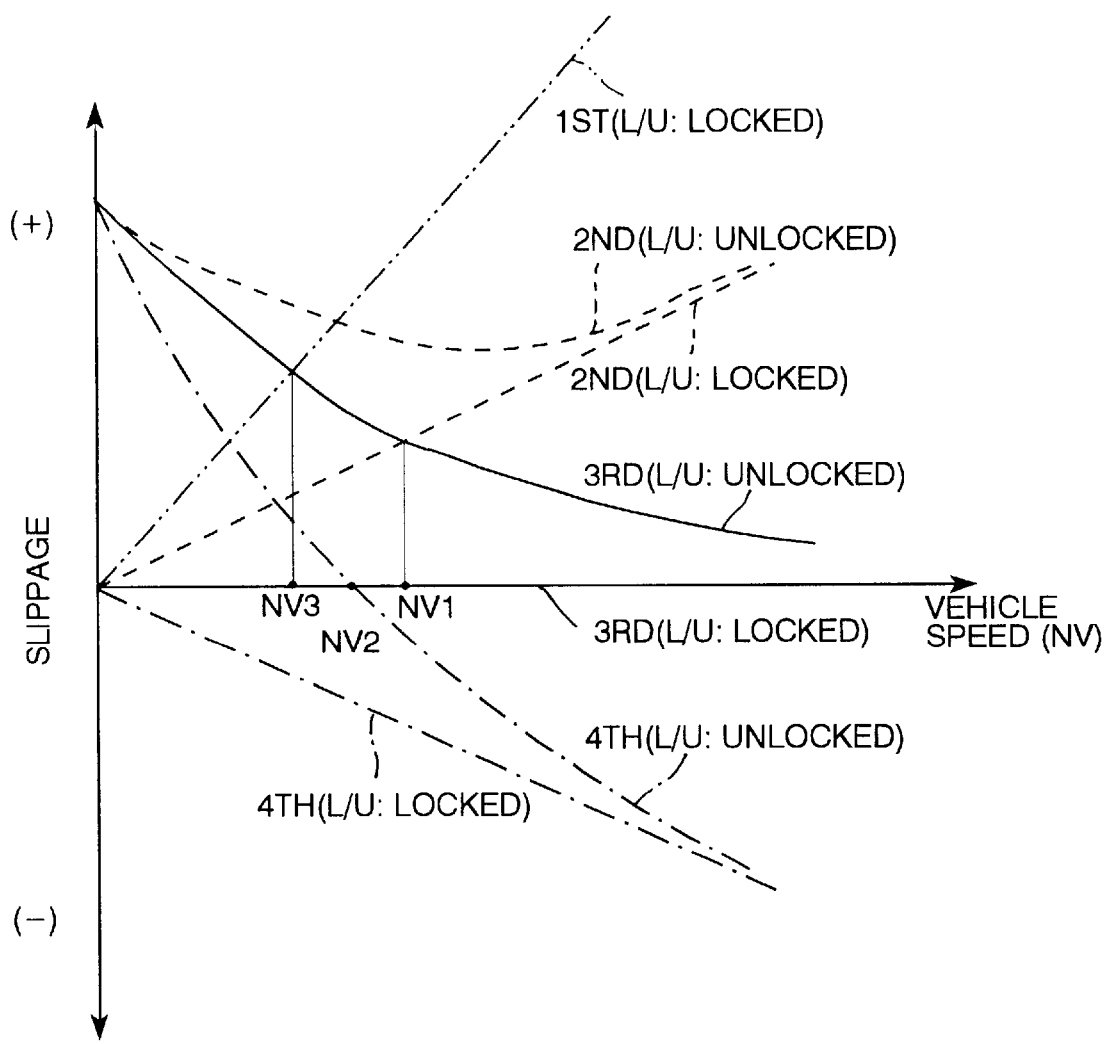
FIG. 12 is a flwochart illustrating a sequence routine of establishing threshold vehicle speeds in the failure decision sequence routine shown in FIG. 11.

FIGS. 11 and 12 show another embodiment of the invention in which vehicle speeds for allowing the failure decision are set in a different manner.

FIG. 12 shows characteristic curves of the estimated slippage of the torque converter in connection with vehicle speeds when the lockup clutch is locked and when the lockup clutch is unlocked.

Considering a case where the third gear is selected as the target gear, the characteristic curve peculiar to the third gear in the case where the lockup clutch is locked is intersected by the characteristic curve peculiar to the fourth gear in the case where the lockup clutch is unlocked at a specific vehicle speed NV2, and the characteristic curve peculiar to the third gear in the case where the lockup clutch is unlocked is intersected by the characteristic curve peculiar to the second gear in the case where the lockup clutch is locked at a specific vehicle speed NV1 and by the characteristic curve peculiar to the first gear in the case where the lockup clutch is locked at a specific vehicle speed NV3. In the case where the third gear is selected as the target gear, since, whenever the vehicle speed is lower than the specific speed NV1, NV2 or NV3 (NV3<NV2<NV1), the estimated slippage is greater for the third gear than for another specific gear, a wrong failure decision possibly occurs. More specifically, the failure decision is correctly executed when the vehicle speed is greater the specific speed NV1 and, however, possibly results in incorrect execution when the vehicle speed is lower than the specific speed NV3. When the vehicle speed is between the specific speeds NV1 and NV3, the failure decision is executed sometimes correctly and sometimes incorrectly. It is of course that these specific speeds NV1–NV3 depend upon gears selected as the target gear.

In this embodiment, although there possibly occurs a wrong failure decision even when the automatic transmission operates normally, the threshold vehicle speed for allowing the execution of the failure decision is established within a range of vehicle speeds greater than the smallest speed NV3 in order to give priority to reliable execution of the failure decision. That is, the threshold vehicle speeds NVX1–NVX4 (see FIG. 3) for allowing the execution of the failure decision are established corresponding to the smallest speed NV3.

In this embodiment, the greatest speed NV1 is employed as a threshold vehicle speed for allowing the withdrawal of a result of the failure decision. That is, the withdrawal of a result of the failure decision is allowed only in a range of vehicle speeds greater than the threshold speed NV1 where there is no possibility of wrong failure decisions.

FIG. 11 shows part of a flowchart of the failure decision sequence routine in which the greatest speed NV1 is employed as a threshold vehicle speed for allowing the withdrawal of a result of the failure decision. As shown in FIG. 11, if the answer to the decision concerning slippage made at step Q28 in FIG. 4 is "NO," an additional decision concerning the threshold vehicle speed NV1 is made at step Q35B between steps Q28 and Q35. Specifically, when the answer to the decision made at step Q28 as to whether the current estimated slippage SLP$_{TG(n)}$ is greater than the first threshold value DS1 is "YES," a decision is made at step Q35B as to whether a vehicle speed NV is greater than the threshold speed NV1. Only when a vehicle speed is greater than the threshold speed NV1, the withdrawal of a result of the failure decision is executed through steps Q35–Q40.

A decision concerning the threshold speed NV1 is also made at step Q49B between steps Q43 and Q49 in FIG. 5. That is, only when a vehicle speed is greater than the threshold speed NV1, the withdrawal of a result of the failure decision is executed through steps Q49–Q54.

The threshold slippage may be given not as a difference but as a ratio between the engine speed and estimated turbine speed.

The result of a decision that there has occurred a failure in the automatic transmission may be used to various purposes in place of, or otherwise in addition to, being shown by the warning device. That is, the result may be stored in the ROM of the control unit U in order to make diagnosis of the automatic transmission at a workshop, or used to execute a special gear shift control upon a failure or to conduct a special control for removing a failure.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A failure decision system for an automatic transmission which is comprised of a torque converter equipped with a lockup clutch for locking said torque converter with a given lockup characteristic, a multiple speed transmission gear mechanism to which engine output torque is transmitted through the torque converter and shift means for automatically shifting said multiple speed transmission gear mechanism to target gears selected according to predetermined shift patterns on the basis of driving conditions including at least a vehicle speed for making a decision of operational failure than a current gear to which the automatic transmission is being shifted by said shift means is different from a selected target gear, said failure decision system comprising:

a speed sensor for detecting a vehicle speed;

a speed sensor for detecting an engine speed;

failure decision means for calculating a turbine speed of said torque converter for a target gear selected according to said vehicle speed and said selected target gear, calculating an amount of slippage occurring in said torque converter on the basis of said engine speed and said calculated turbine speed, determining a threshold amount of slippage to which a maximum amount of slippage possibly occurring in said torque converter is set corresponding to said vehicle speed and said target gear when said target gear is regarded as having been correctly achieved in said multiple speed transmission gear mechanism, comparing said calculated amount of slippage with said threshold amount of slippage and deciding an operational failure that a current gear to which said automatic transmission is being shifted is different from said selected target gear based on an occurrence of said calculated amount of slippage in excess across said threshold amount of slippage.

2. A failure decision system as defined in claim 1, wherein said failure decision means further interrupts said decision of failure while said torque converter unstably causes slippage.

3. A failure decision system as defined in claim 2, wherein said failure decision means further interrupts said decision of failure during a gear shift.

4. A failure decision system as defined in claim 3, wherein said failure decision means interrupts said decision of failure during a presence of a gear shift command.

5. A failure decision system as defined in claim 4, wherein said failure decision means interrupts said decision of failure for a predetermined period of time after a disappearance of said gear shift command.

6. A failure decision system as defined in claim 4, wherein said predetermined period of time is established to be longer with a decline in temperature of an oil in said multiple speed transmission gear mechanism.

7. A failure decision system as defined in claim 2, wherein said failure decision means further interrupts said decision of failure during coasting.

8. A failure decision system as defined in claim 1, wherein said failure decision means withdraws a decision of failure when said calculated amount of slippage becomes within said predetermined threshold slippage after having decided said failure once.

9. The failure decision system as defined in claim 8, wherein said failure decision means interrupts said withdrawal of said decision of failure when said vehicle speed is lower than a first specified speed.

10. The failure decision system as defined in claim 9, wherein said first specified speed is set to a vehicle speed at which a turbine speed for a target gear while said lockup clutch locks said torque converter is identical with a turbine speed for a gear lower than said target gear while said lockup clutch unlocks said torque converter.

11. The failure decision system as defined in claim 8, wherein said failure decision means makes said decision of failure only when said vehicle speed is higher than a second specified speed.

12. The failure decision system as defined in claim 11, wherein said second specified speed is set to a vehicle speed at which a turbine speed for a target gear while said lockup clutch locks said torque converter is identical with a turbine speed for the lowest gear while said lockup clutch unlocks said torque converter.

13. The failure decision system as defined in claim 1, wherein said failure decision means further decided an occurrence of said operational failure when said calculated amount of slippage become smaller than zero.

14. The failure decision system as defined in claim 1, and further comprising lockup clutch control means for controlling lockup and unlock conditions of said lockup clutch according to engin operating conditions and lockup failure decision means for deciding a failure of said lockup clutch control means based on an occurrence of said calculated amount of slippage greater than a specified amount of slippage smaller than said threshold amount of slippage while said lockup clutch control means provides a lockup signal with which said lock up clutch is locked up.

15. The failure decision system as defined in claim 1, wherein failure decision means decides a failure that a current gear to which said automatic transmission is being shifted is different from said selected target gear based on an occurrence of said calculated amount of slippage greater than said threshold amount of slippage for a predetermined period of time.

16. The failure decision system as defined in claim 15, wherein said predetermined decision time is altered according to driving conditions.

17. A failure decision system as defined in claim 16, wherein said predetermined decision time is altered according to target gears.

18. A failure decision system as defined in claim 17, wherein said predetermined decision time is altered shorter as said target gear becomes lower.

19. A failure decision method of making a decision of operational failure of an automatic transmission that a current gear to which the automatic transmission is being shifted is different from a selected target gear, said automatic transmission comprising a torque converter equipped with a lockup clutch for locking said torque converter with a given lockup characteristic, a multiple speed transmission gear mechanism to which engine output torque is transmitted through the torque converter and shift means for automatically shifting said multiple speed transmission gear mechanism to target gears selected according to predetermined shift patterns on the basis of driving conditions including at least a vehicle speed, said method comprising the steps of:

detecting a vehicle speed;

detecting an engine speed;

calculating a turbine speed of said torque converter for a target gear selected according to said vehicle speed;

calculating an amount of slippage occurring in said torque converter on the basis of said engine speed and said calculated turbine speed;

determining a threshold amount of slippage to which a maximum amount of slippage possibly occurring in said torque converter is set corresponding to said vehicle speed and said target gear when said target gear is regarded as having been correctly achieved in said multiple speed transmission gear mechanism;

comparing said calculated amount of slippage with said threshold amount of slippage; and deciding an operational failure that a current gear to which said automatic transmission is being shifted is different from said selected target gear based on an occurrence of said calculated amount of slippage in excess across said threshold amount of slippage.

20. The failure decision system as defined in claim 19, wherein said failure decision means further decides an occurrence of said operational failure when said calculated amount of slippage becomes smaller than zero.

21. The failure decision system for an automatic transmission which is comprised of a torque converter equipped with a lockup clutch for locking said torque converter with a given lockup characteristic, a multiple speed transmission gear mechanism to which engine output torque is transmitted through the torque converter and shift means for automatically shifting said multiple speed transmission gear mechanism to target gears selected according to predetermined shift patterns on the basis of driving condition including at least a vehicle speed for making a decision of operational failure that a current gear to which the automatic transmission is being shifted by said shift means is different from a selected target gear, said failure decision system comprising:

a speed sensor for detecting a vehicle speed;

a speed sensor for detecting an engine speed;

failure decision means for calculating a turbine speed of said torque converter for a target gear selected according to said vehicle speed and said selected target gear, calculating an amount of slippage occurring in said torque converter on the basis of said engine speed and said calculated turbine speed, determining a threshold amount of slippage to which a maximum amount of slippage possibly occurring in said torque converter is set correspondingly to said vehicle speed and said target gear when said target gear is regarded as having been correctly achieved in said multiple speed transmission gear mechanism, comparing said calculated amount of slippage when said threshold amount of slippage, and making decision of operational failure that a current gear to which said automatic transmission is being shifted is different from said selected target gear based on an occurrence of said calculated amount of slippage in excess across said threshold amount of slippage only when said vehicle speed is higher than a second specified speed which is a vehicle speed at which a turbine speed for a target gear while said lockup clutch locks said torque converter is identical with a turbine speed for the lowest gear while said lockup clutch unlocks said torque converter.

* * * * *